United States Patent [19]
Brotz

[11] Patent Number: 5,545,879
[45] Date of Patent: Aug. 13, 1996

[54] DEVICE AND METHOD FOR THE BREWING OF COFFEE IN A MICROWAVE OVEN ENVIRONMENT

[76] Inventor: Gregory R. Brotz, P. O. Box 1322, Sheboygan, Wis. 53081

[21] Appl. No.: 263,387

[22] Filed: Jun. 22, 1994

[51] Int. Cl.⁶ ................................ H05B 6/64
[52] U.S. Cl. ................ 219/689; 219/730; 99/295; 99/DIG. 14; 426/241
[58] Field of Search ................ 219/689, 759, 219/730; 99/295, 298, DIG. 14; 426/234, 241, 82

[56] References Cited

U.S. PATENT DOCUMENTS

| | | | |
|---|---|---|---|
| 2,133,166 | 10/1938 | Fritsche | 426/82 |
| 4,224,168 | 9/1980 | Trägårdh | 99/295 |
| 4,577,080 | 3/1986 | Grossman | 219/689 |
| 4,756,915 | 7/1988 | Dobry | 426/234 |
| 4,908,222 | 3/1990 | Yu | 219/689 |
| 4,948,601 | 8/1990 | Serbu | 426/82 |
| 4,990,734 | 2/1991 | Hirsch | 219/689 |
| 4,999,470 | 3/1991 | Fuchs, Jr. | 219/689 |
| 5,168,140 | 12/1992 | Welker | 219/689 |
| 5,233,145 | 8/1993 | Schiettecatte | 219/689 |
| 5,281,785 | 1/1994 | Pasbrig | 219/689 |
| 5,300,743 | 4/1994 | Park | 219/689 |
| 5,315,083 | 5/1994 | Green | 219/689 |
| 5,365,745 | 11/1994 | Lin | 99/306 |

*Primary Examiner*—Philip H. Leung
*Attorney, Agent, or Firm*—William Nitkin

[57] ABSTRACT

A device and method for the brewing of a cup of coffee from ground coffee by using a container disposed in a cup containing water, such container having a bottom with a sieve mesh therein which receives water from the cup therethrough with the sides of the container extending above the surface of the water. Coffee is placed in the container and floats on the water to be roasted while being heated in a microwave oven which heating also then brews the coffee beverage. When the coffee is brewed to taste, the container is then lifted out of the cup and any remaining undissolved ground coffee is strained out of the brewed coffee by the sieve mesh in the bottom of the container.

1 Claim, 3 Drawing Sheets

DEVICE AND METHOD FOR THE BREWING OF COFFEE IN A MICROWAVE OVEN ENVIRONMENT

BACKGROUND OF THE INVENTION

Field of the Invention

The device and method of this invention reside in the area of coffee brewing and and more particulary relate to the brewing of a serving of coffee in a microwave oven.

Description of the Prior Art

There are many devices and methods used to prepare hot coffee. Coffee percolators brew coffee by passing boiling water through ground coffee to impart coffee flavor to such water. Boiling water can be added to freeze-dried coffee crystal to prepare an instant serving of coffee. Also, instant coffee in the form of powdered coffee granules can be dissolved in boiling water. Coffee bags similiar to tea bags are also known in the art.

SUMMARY OF THE INVENTION

It is an object of this invention to provide a device and method for preparing a brewed cup of coffee in a microwave oven, the flavor of which brewed coffee is improved by the action of the microwaves on the ground coffee as it is heated in the microwave oven.

It is a further object of this invention to provide a device and method for easily and conveniently preparing a serving of brewed coffee without the necessity of brewing multiple cups of coffee.

The device of this invention consists of a microwave-safe container having a sieve mesh as its bottom which is placed within a microwave-safe cup, such container holding the ground coffee disposed therein. The ground coffee initially floats on the surface of the water in the cup due to surface tension on the surface of the water. When the microwave oven is activated, the initial action of the microwaves heats the floating ground coffee and further cooks and/or roasts them such that the flavor of the coffee is enhanced by the microwave heating process. As the ground coffee is heated, it reacts with the water, brewing the coffee and imparting the improved coffee flavor to the water. After the ground coffee and water have been sufficiently brewed to the individual taste of the preparer, the container is lifted out of the cup with any undissolved ground coffee particles remaining in the container being strained out of the water by the sieve mesh located at the bottom of the container, leaving a serving of brewed coffee in the cup to be consumed. Other embodiments of this invention can include the use of a microwave-heatable member to add more heat while the ground coffee is being roasted.

DESCRIPTION OF THE PREFERRED EMBODIMENT(S)

Figure 1:
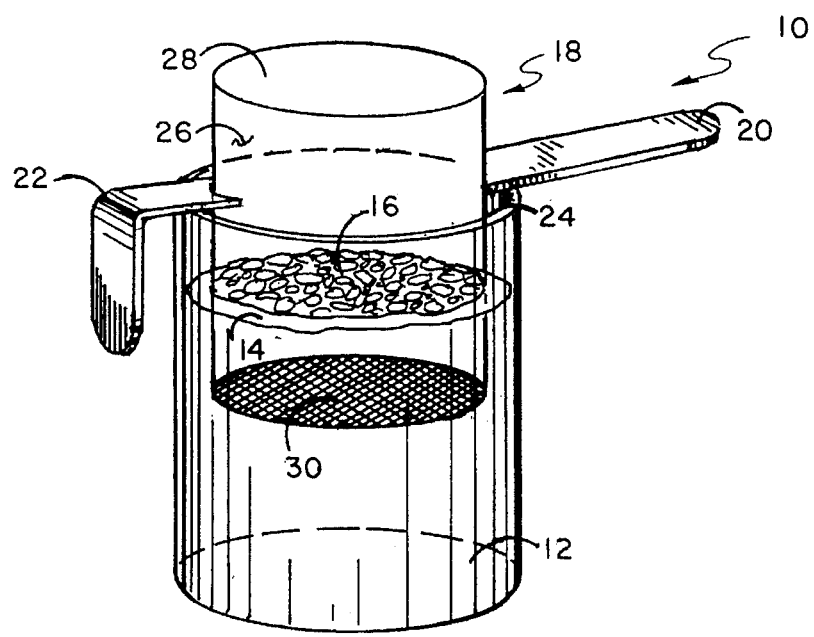
FIG. 1 illustrates a perspective cutaway view of the device of this invention.
Figure 2:
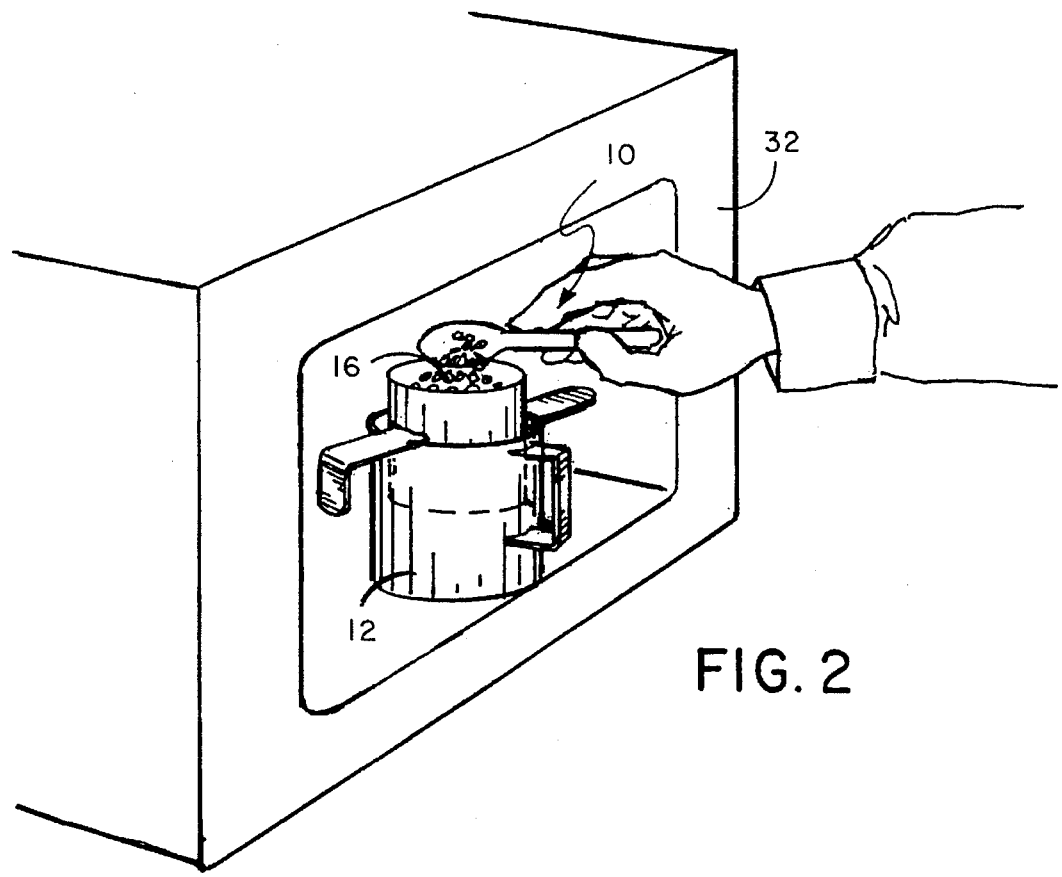
FIG. 2 illustrates a perspective view of the device of this invention placed in a microwave oven as the preparer adds ground coffee to the container.
Figure 3:
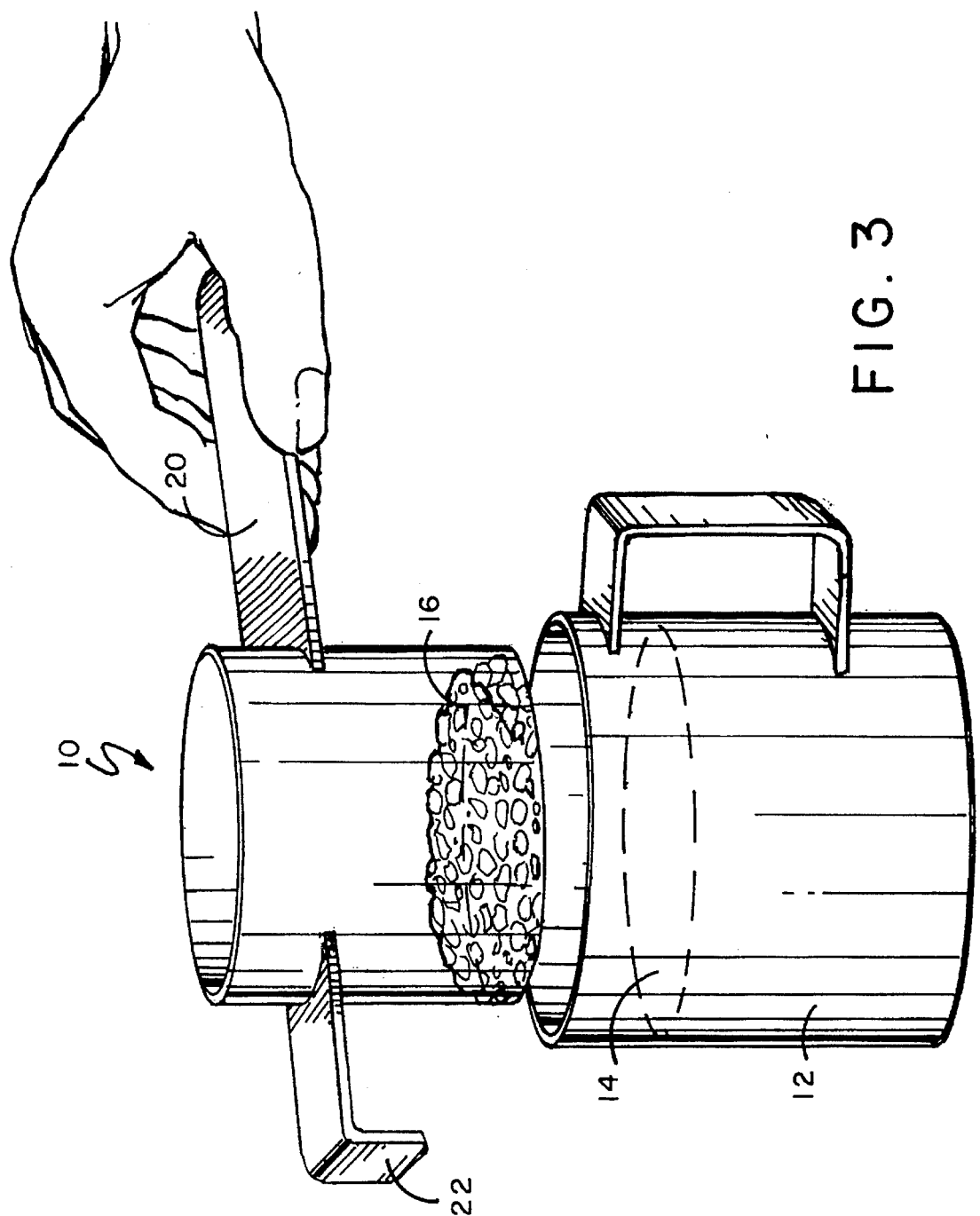
FIG. 3 illustrates a perspective view of the container containing the undissolved ground coffee being lifted out of the cup.

FIG. 1 illustrates a perspective cutaway view of the device of this invention showing cup 12 containing cold water 14. Within cup 12 and water 14 is disposed container 10. Cup 12 and container 10 can be made of microwave-safe material such as certain plastics. Provided are means to grasp container 10, such as handle 20 or equivalent means, and means to suspend the sieve mesh bottom of the container in the water, such as second member 22 or equivalent means, both of which extend at the same height from portions of side walls 26 of container 10. Container 10 is of a size to fit within opening 24 of cup 12 with handle 20 and second member 22 located opposite one another, the handle and second member each being of a length and width to rest upon the rim of cup 12 and suspend container 10 in the cup such that the sieve mesh bottom of container 10, which has fine mesh sieve mesh 30, is disposed under the surface of water 14. The surface of water 14 rises above sieve mesh 30 as the water passes through sieve mesh 30 into container 10 to seek its same level as in cup 12. Side wall 26 of container 10 extends above the surface of water 14. FIG. 2 shows the device of this invention placed within a microwave oven 32 and the preparer adding ground coffee to container 10. Ground coffee 16 which has been deposited in the container, floats on the surface of water 14 having been deposited through opening 28 in container 10. The ground coffee and the water are not stirred. The activation of microwave oven 32 provides microwaves which heat and further roast ground coffee 16 floating on the surface of water 14 within container 10. The microwave cooking of the ground coffee enhances the flavor of the coffee, and this improved coffee flavor is imparted to the water during the brewing of the coffee by the method of this invention. The coffee, being in direct contact with the water, absorbs some water; and the microwaves cause steam and superheated steam to aid in the process of roasting the coffee further. After the cooking occurs for a desired period of time, the flavoring elements of the coffee grounds dissolve and are released in the then-heated water, and the coffee flavor spreads through the water within container 10, through sieve mesh 30 and out into the rest of the water within cup 12. When the brewing process is done to the preparer's individual taste, cup 12 is removed from the microwave oven, and container 10 can be grasped and lifted by attached handle 20 out of cup 12, as seen in FIG. 3. Any remaining ground coffee 16 within container 10 is caught in sieve mesh 30 such that any coffee grounds remaining are lifted out of the water, leaving only a serving of brewed coffee for consumption. The amount of ground coffee initially placed in container 10 depends on the desired strength of the brewed cup of coffee. The length of time of heating in the microwave oven depends on the microwave oven wattage.

Figure 4:
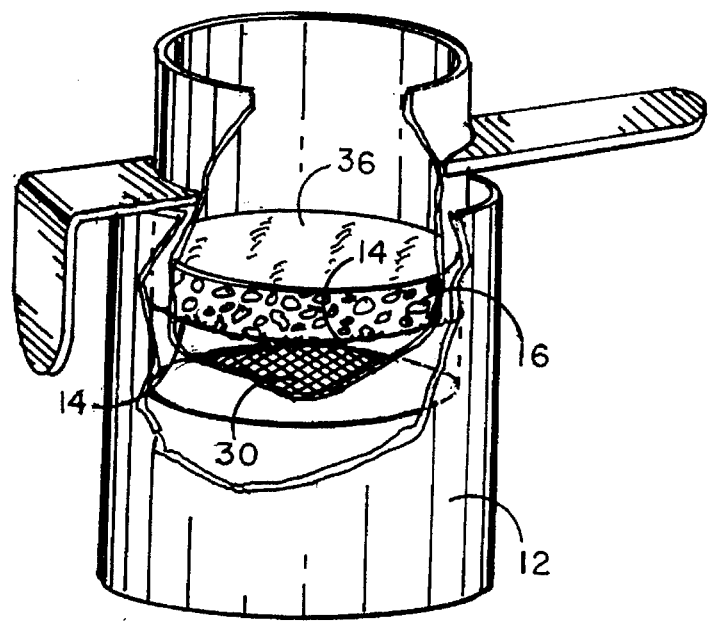
FIG. 4 illustrates a perspective view of the device of this invention having a microwave-heatable member disposed on top of the floating coffee.
Figure 5:
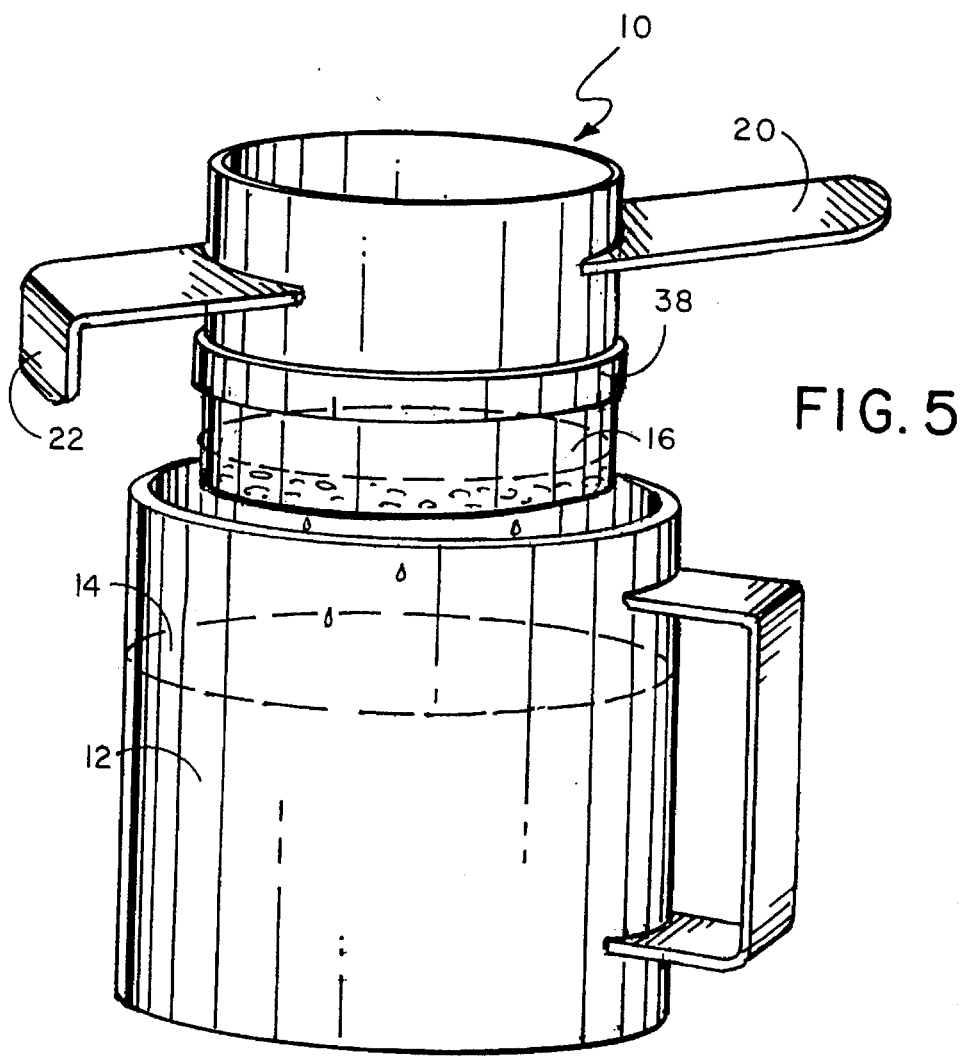
FIG. 5 illustrates a perspective view of the device of this invention surrounded by a microwave-heatable member.

FIG. 4 illustrates a further embodiment of this invention wherein a microwave-heatable member 36, such as a small sheet of microwave paper or equivalent, is placed on top of the floating ground coffee 16 to additionally heat and roast such ground coffee without causing them to sink below the surface of the water. FIG. 5 illustrates yet another embodiment of this invention wherein a microwave-heatable member, such as ring 38, is positioned around container 10 to help heat and roast the ground coffee. Such ring 38 can be made of coated metal or equivalent.

Although the present invention has been described with reference to particular embodiments, it will be apparent to those skilled in the art that variations and modifications can be substituted therefor without departing from the principles and spirit of the invention.

I claim:

1. A method of brewing a serving of coffee from ground coffee in a microwave oven, comprising the steps of:

placing a container having side walls, and a sieve mesh bottom into a cup containing water;

suspending said sieve mesh below the surface of said water with said side walls extending from said sieve mesh bottom to above the surface of said water;

floating said ground coffee on said surface of said water within said container;

microwaving said container, ground coffee, water and cup in said microwave oven;

cooking said ground coffee floating in said water to further roast said ground coffee;

dissolving said ground coffee in said water by the action of beating by said microwave cooking;

brewing said ground coffee in said water to form a coffee beverage;

lifting said container completely out of said water in said cup; and removing any undissolved ground coffee by said sieve mesh catching said undissolved grounds in said bottom of said container when said container is lifted out of said cup.

* * * * *

UNITED STATES PATENT AND TRADEMARK OFFICE
CERTIFICATE OF CORRECTION

PATENT NO. : 5,545,879
DATED : August 13, 1996
INVENTOR(S) : Gregory R. Brotz

It is certified that error appears in the above-identified patent and that said Letters Patent is hereby corrected as shown below:

Column 4, line 6 delete "beating" and substitute --heating-- therefor.

Signed and Sealed this

Fifth Day of November, 1996

Attest:

BRUCE LEHMAN

Attesting Officer

Commissioner of Patents and Trademarks